United States Patent

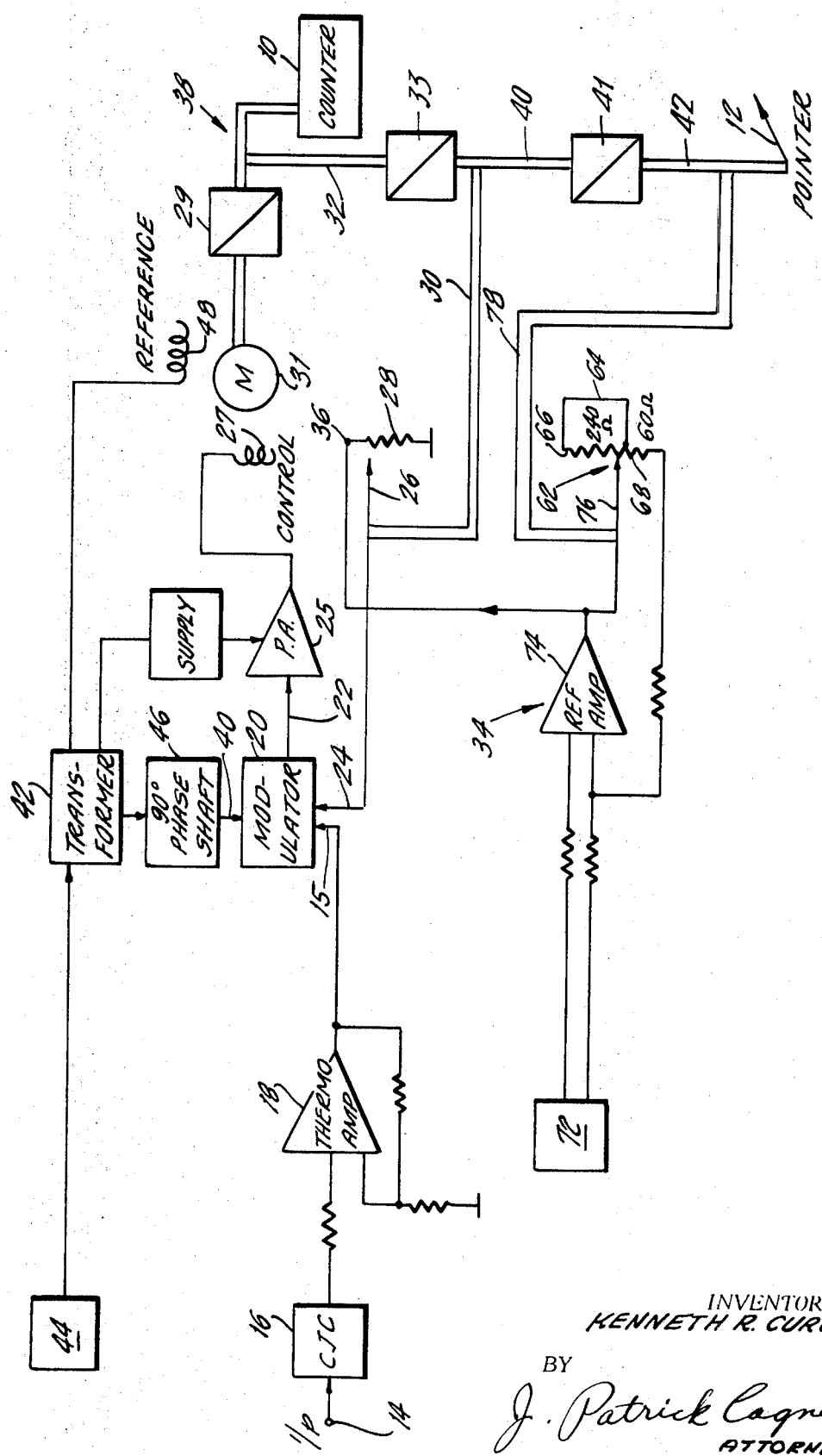

[11] 3,576,130

[72] Inventor Kenneth R. Curwen
 Southampton, England
[21] Appl. No. 819,245
[22] Filed Apr. 25, 1969
[45] Patented Apr. 27, 1971
[73] Assignee Kollsman Instrument Corporation
 Syosset, N.Y.
[32] Priority Mar. 31, 1969
[33] Great Britain
[31] 16629/69

[54] TEMPERATURE INDICATOR
 4 Claims, 7 Drawing Figs.
[52] U.S. Cl. ................................................... 73/359
[51] Int. Cl. ..................................................... G01k 7/14
[50] Field of Search ........................................... 73/362 (R), 359, 360

[56] References Cited
 UNITED STATES PATENTS
 3,339,414 9/1967 Coor ............................ 73/362
 3,472,073 10/1969 Irani ............................ 73/360

Primary Examiner—Louis R. Prince
Assistant Examiner—Denis E. Corr
Attorneys—E. Manning Giles, J. Patrick Cagney, Peter S. Lucyshyn and Richard G. Kinney ABSTRACT: Temperature indicators for producing linearized indications from temperature-responsive sensing means that develop an input signal bearing a predetermined nonlinear relationship to the instantaneous temperature of the device being monitored. In one embodiment, the input signal is utilized as one input to a comparator which develops an error signal representative of the difference between the input signal and a compensated feedback signal representative of the instantaneous position of an indicator such as a dial or pointer. The error signal is used to drive a servomotor which continuously repositions the indicator in accordance with the magnitude and phase of the error signal to maintain a correct indication of the temperature being sensed by the thermally responsive sensing means. In the other embodiment, the input signal is substantially linearized by a servo-controlled nonlinear amplifier and then fed to a comparator which also receives a linear feedback signal from the servo. In both embodiments, the indicator is compensated by providing a shorted linear potentiometer network arranged to introduce a nonlinear compensation function matched to the nonlinearity of the temperature-responsive sensing means over the normal operating temperature of the device being monitored.

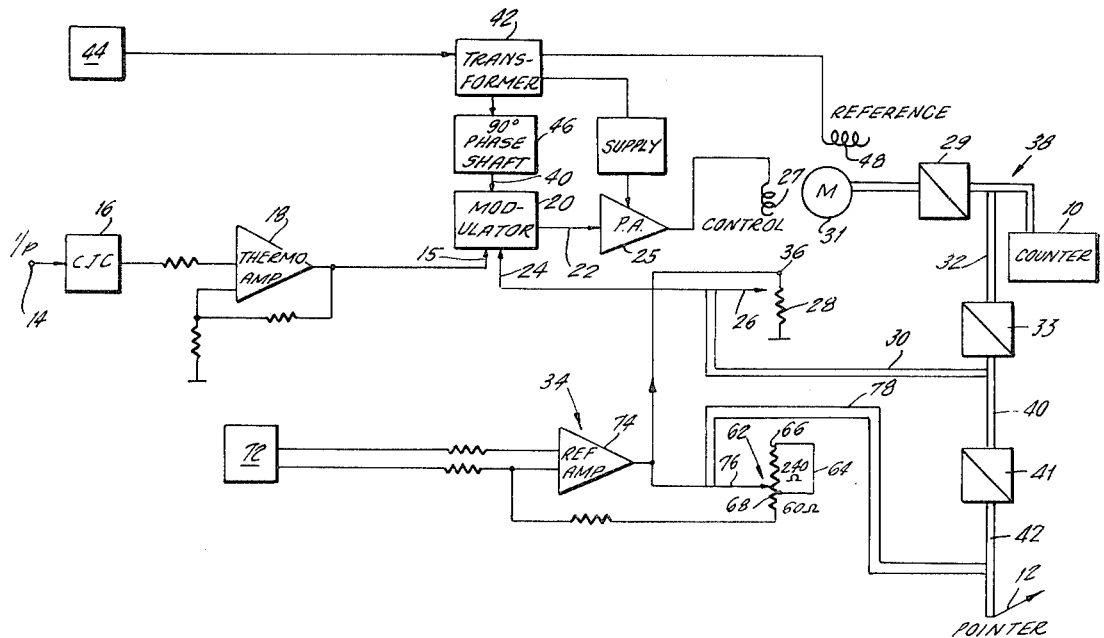

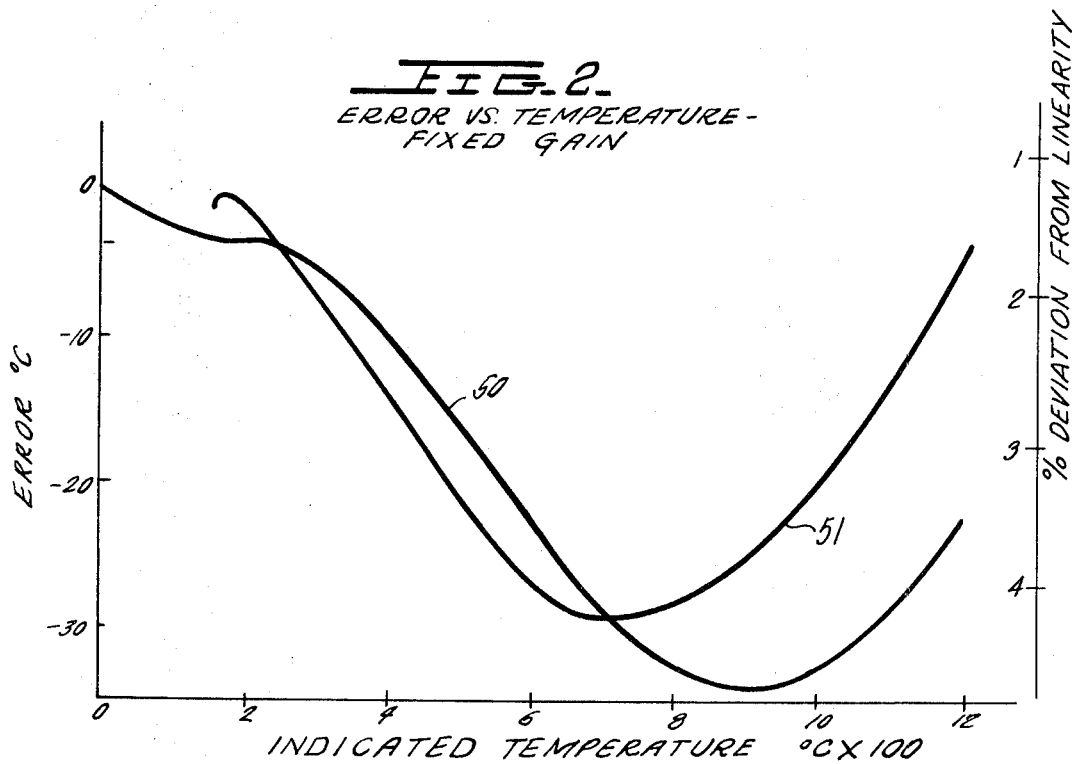
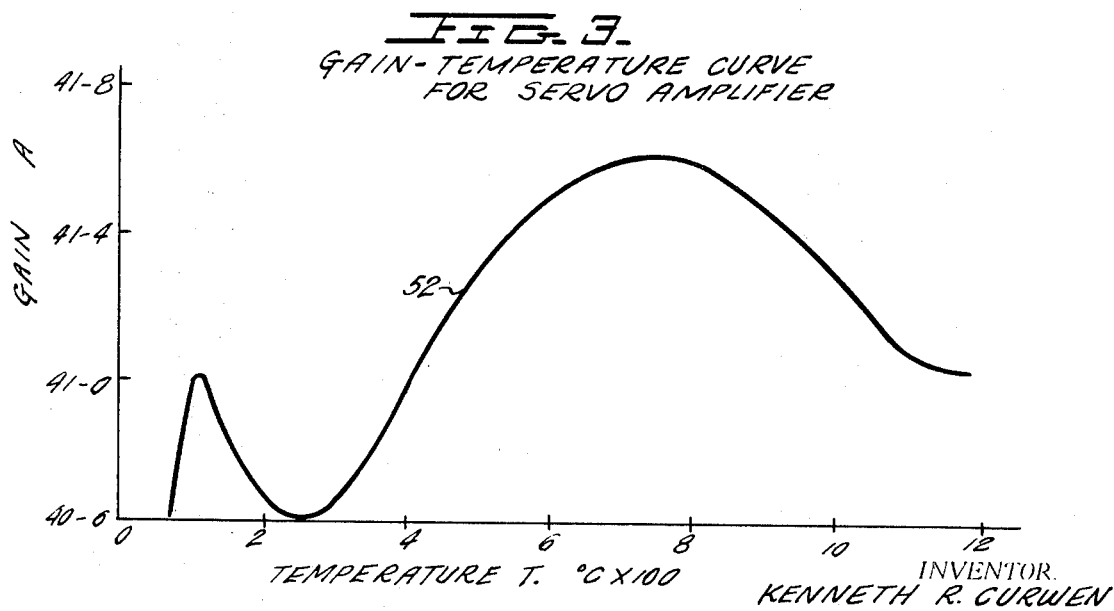

RESISTANCE POSITION CURVE FOR SHORTED POTENTIOMETER

GAIN VS. INDICATION FOR REF. AMP.

INVENTOR.
KENNETH R. CURWEN
BY
J. Patrick Cagney
ATTORNEY

TEMPERATURE INDICATOR

This invention relates to a servo-controlled indicator system wherein the response of the temperature-sensing device is nonlinear and wherein it is desired to produce an indication which is linear and wherein it is desired to produce an indication which is linear with temperature. The general functioning of a servo indicator includes the use of a signal ratio element such as a linear potentiometer which controls the ratio level of a feedback signal in accordance with the actual position of a temperature indicator.

It is well known that the useful life of an engine, such as a jet engine, is dependent to a great extent upon the temperature at which such engine is operated. Thus it is known that with a relatively small increase in operating temperature, engine life can depart substantially from a relationship wherein engine life is primarily dependent upon the number of hours of operation. Thus, steps have been taken to produce engine life recorders which will continuously produce as an output a value representative of the consumed life of an engine wherein such consumed life will take into account not only the number of hours run, but the fluctuation in temperature during operation.

In addition to utilizing the instantaneous temperature of a jet engine as an input to the aforementioned type of engine life recorder, it is also desirable that the pilot, or other personnel, be instantaneously apprised of the operating temperature of the engine of his craft. Thus there is a need for the temperature indicator.

The present invention is directed to a temperature indicator arrangement which is simple, inexpensive to manufacture, accurate and reliable over extended periods of operation. In the indicator arrangements disclosed herein, the indicating device such as a drum counter or a pointer is positioned under the control of a servosystem. In the case of thermocouples of the Chromel-Alumel type such as are used for monitoring the normal operating temperature of a jet engine, there is a predetermined nonlinearity of the thermocouple signal response relative to the temperature being sensed. Thus, for the particular Chromel-Alumel thermocouple utilized in the indicator embodiments disclosed herein, it can be shown that the deviation due to such nonlinearity leads to a difference in temperature of as much as 30° C. between the true temperature in the engine and the resulting signal level. The instant invention provides systems which automatically compensate and correct for the predetermined deviation from the norm of the response curve of the thermocouple.

Thus, a temperature indicator system is provided for operation over a predetermined range of temperature, the system having temperature-responsive means providing an input signal that is representative of actual temperature and that exhibits a predetermined nonlinear signal versus temperature response function such that a temperature plot of percent deviation from linearity of said input signal is characterized by a symmetrical valley over the range, servo indicator means responsive to the input signal for producing indicator-positioning movement and compensation means connected in the system for introducing gain compensation matched to the temperature response, the compensation including a potentiometer having a symmetrical resistance path bridged by a short circuit shunt and traversed by a tap connected in gain controlling relationship and movable between opposite ends of the path in a relationship that is linear with indicator-positioning movement over the range such that the circuit impedance presented by the potentiometer at the tap exhibits a corresponding symmetrical hump over the range.

In one of the disclosed embodiments, compensation is introduced in a servo-feedback system to provide a feedback voltage for comparison with the voltage signal representative of the sensed temperature. A reference signal, varied in a predetermined relation to the actual indicator position, is applied to a linear ratio device to introduce the desired nonlinearity in the feedback voltage.

In the other embodiment, a nonlinear amplifier is servocontrolled to provide compensation for linearizing the input signal which is then compared with a feedback reference signal that is linear with indicator position.

During operation of either system, any error signal developing between the sensed signal due to temperature and the compensated feedback signal, represents the difference between the actual position of the indicating device and the true position (as determined by the instantaneous temperature). The error signal drives the servomotor to position the indicator in accordance with the magnitude and phase of the error. As the indicator position is corrected to the true temperature condition the error signal approaches zero.

Other features and advantages of the invention will be apparent from the following description and claims and are illustrated in the accompanying drawings which show structures embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same:

FIG. 1 is a schematic block diagram representing one embodiment of the temperature indicator of the instant invention;

FIG. 2 graphically illustrates the absolute error due to the deviation from linearity for the signal versus temperature response curve of a particular temperature-responsive sensing means being utilized in the instant invention;

FIG. 3 illustrates the response curve of amplifier gain versus temperature required to linearize the deviation depicted in the curve of FIG. 2;

Referring to FIG. 1, there is shown the temperature indicator of the instant invention primarily utilized to present a visual indication by a counter 10 and/or a pointer 12 of the temperature of a device being monitored by a temperature-responsive sensing means such as a conventional Chromel-Alumel thermocouple 14. Although in no way intended to be limited by such disclosure, it is noted that the instant invention has found application in providing an indication of the temperature of a jet engine, in which case the hot junction of one or more Chromel-Alumel thermocouples is located at the regions of the engine where an indication of temperature is desired, and wherein the cold junction of such thermocouple takes place at a cold junction compensator 16. In the situation where a plurality of thermocouples were being utilized the input 14 would represent an average signal. As is well known in the art, such thermocouples produce a voltage signal of small amplitude representing the instantaneous value of the temperature sensed.

Figure 4:
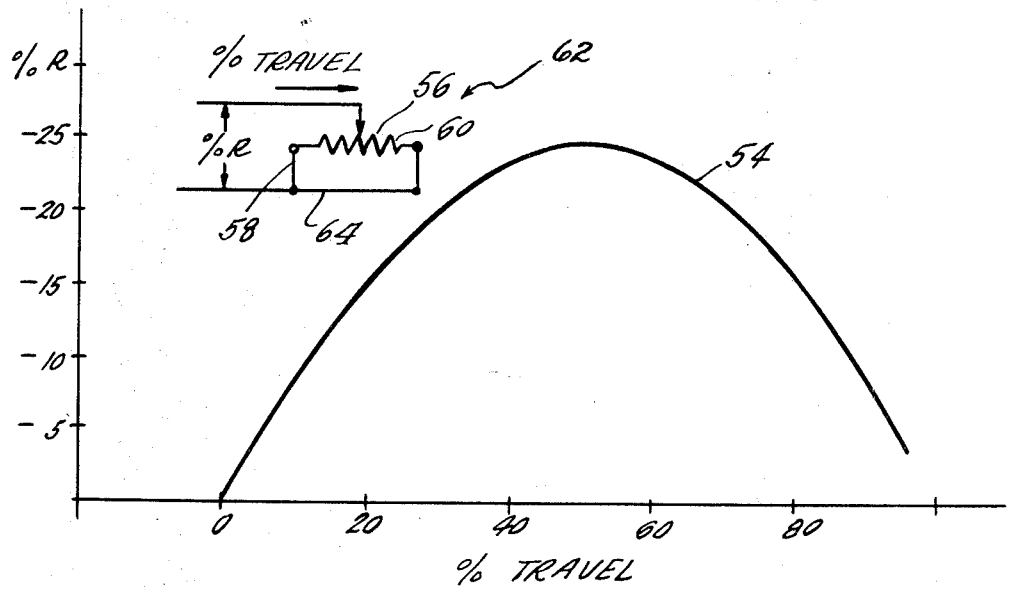
FIG. 4 illustrates the response curve obtained by use of a particular potentiometer arrangement which approximates the symmetrical hump portion of the curve of FIG. 3.

As noted, the thermocouple signal is fed into the cold junction compensator 16, the purpose of which is to convert the Chromel-Alumel thermocouple signal into a millivolt signal normalized at 0° C.

This normalized temperature signal which deviates from linearity with temperature as will be explained hereinafter with relation to the response curve 50 in FIG. 2, is supplied to a thermocouple amplifier 18 so that an amplified nonlinear temperature signal, as shown at 15, is fed to the modulator 20 as one of the input signals which are to be compared. The other input signal to the comparison device 20 is indicated at 24 and is derived from the position of the wiper 26 of a linear potentiometer 28.

The input signals 15 and 24 determine an error signal 22 at the output of the modulator 20. This error signal is fed to a power amplifier 25 connected to energize a control winding 27 of a servomotor 31 which operates through suitable gearing 29 to effect continuous positioning of the indicator structure, designated generally at 38 until the error signal 22 reaches a null.

For definitional purposes, the indicating structure of the invention, as generally designated at 38, is shown to include counter 10, a shaft 32 driving gearing 33 to in turn drive an intermediate shaft 40 which is shown driving additional gearing 41 that connects to the pointer shaft 42. It should be understood that other utilization devices may be used in place of or in conjunction with the indicating structure. Thus, in a situation where the output of the system is fed as input to another device, such as in an engine life recorder installation, there would be no necessity of a visual output such as is provided by counter 10 or pointer 12. In such case, the utilization portion of the device might simply relate to the instantaneous position of the shaft 32 or the instantaneous position of the motor 31 which drives shaft 32.

The stepdown ratios of the gearing units are 3:1 for unit 29, 12.5:1 for unit 33, and 10.3:1 for unit 41.

The embodiment of FIG. 1, a compensation system, as designated generally at 34, is mechanically ganged to the pointer shaft through linkage 78 and is controlled by the instantaneous position thereof to apply a voltage signal to the terminal 36 of the potentiometer at a level which is related to the position of shaft 32 in a predetermined nonlinear fashion. The tap 26 is moved along the linear pot 28 by means of the linkage 30 so that a portion of the voltage applied at terminal 36 is fed back as the input signal 24 to the comparison device 20.

The function of the compensated feedback system, therefore, is to provide an input signal 24 characterized by a nonlinear relationship of voltage to indicated temperature, this nonlinear relationship being matched to the nonlinear relationship which is the characteristic function of the Chromel-Alumel thermocouple as represented by the curve 50 in FIG. 2. Because the nonlinearity of the compensated feedback system is appropriately matched to the thermocouple response function, the existence of any error signal 22 means that the indicator structure 38 is not registering the true temperature being sensed by the thermocouple 14. The error signal 22 energizes the control winding 27 and thereby drives the motor 31 to correct the position of the indicator structure 38. When the indicator represents the actual sensed temperature, the input signals 15 and 24 equalize and the error signal 22 goes to zero so that the motor is no longer energized. The system repeats this action whenever the input signals 15 and 24 become unequalized, for example, due to changes in the temperature being sensed.

The comparator 20 is actually a chopper modulator which includes an input driving signal 40 developed by a transformer 42 the primary of which derives from a suitable power source 44. Thus, the error signal 22 will actually be a square wave whose amplitude is modulated (increased or made smaller) in accordance with the difference in magnitude of the input signals 15 and 24 and whose phase (with respect to the input signal 40) will be dependent upon which input signal 15 or 24 is larger. This square wave modulated output signal 22 will thus control the direction and duration of energization of the motor 31 such that the indicating portion 38 of the device will always follow the temperature being represented by the thermocouple 14.

A 90° phase shifter 46 is interposed between the transformer 42 and the modulator 20 since the servomotor 31 customarily requires a quadrature reference signal developed on the winding 48. By performing the phase shifting intermediate the transformer and modulator, the system is simplified and smaller components can be used as compared to the usual series capacitor.

As mentioned previously, it is known that temperature-responsive sensing means such as thermocouples are nonlinearly responsive over large operating ranges. FIG. 2 illustrates this phenomenon for a thermocouple which might be utilized in the jet engine indicator of the instant invention. The response curve 50 of FIG. 2 illustrates that over an operating temperature of from 0°—1200° C., the signal developed by the thermocouple deviates markedly from true temperature being sensed. Furthermore, because of the degree of irregularity of the curve, compensating for this error represents a difficult problem, one which cannot be solved by adding an easily derived correction voltage.

The curve 50 which represents the absolute error in the sensed temperature can be converted into a temperature plot of percent deviation from linearity (that is, percent error). Such a temperature plot is shown at 51 in FIG. 2 and is derived by converting the absolute error in degrees as determined from curve 50 into the percent error. It may be noted that the curve 51 exhibits a symmetrical valley over the temperature range from 350° to 900° C.

The correction system illustrated at 34 in FIG. 1, therefore, uses a different correction technique, explained as follows. If a graph is plotted of the required gain to give true degrees C. from thermocouple input voltage (e.g. thermocouple input × constant × gain = true degrees C.), a function as illustrated in FIG. 3 is obtained. This curve 52 conveniently exhibits a symmetrical hump over the range of temperature of 350°—900° C., which is the normal operating range of a jet engine. A symmetrical hump of this shape can be obtained between the wiper and two shorted ends of a linear potentiometer as is represented by curve 54 of FIG. 4, which was plotted with resistance as the ordinate and wiper position as the abscissa. Thus, curve 54 of FIG. 4 represents the response of a potentiometer arrangement 56 which has a linear resistance path with its two ends 58 and 60 bridged by a short circuit shunt 64.

Figure 5:
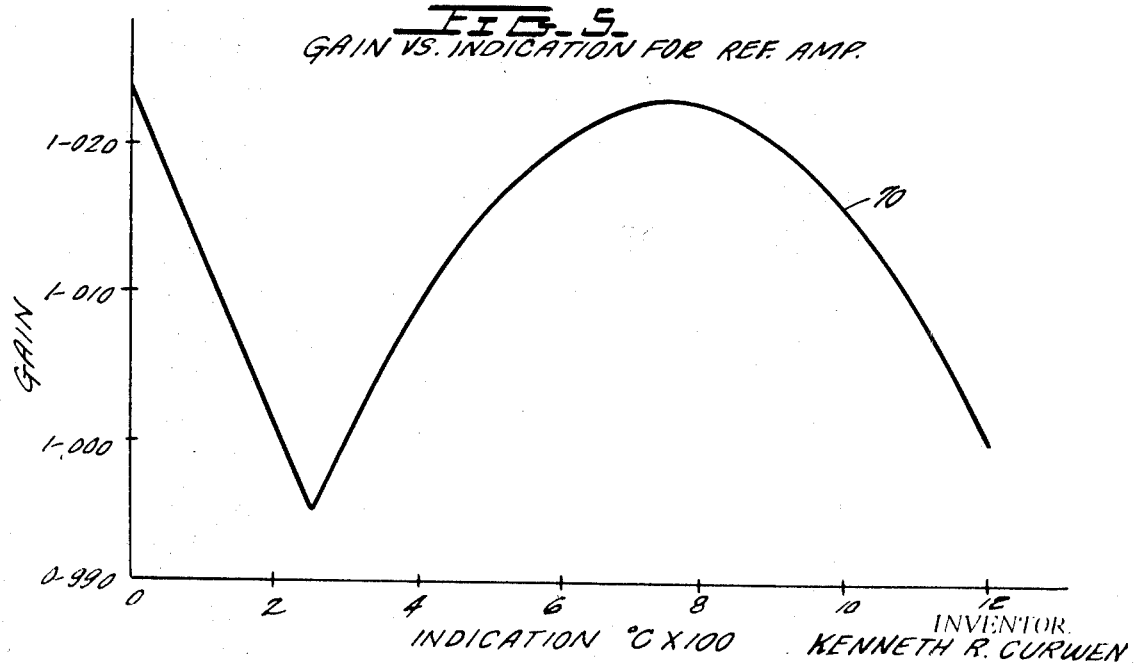
FIG. 5 illustrates the response curve for the complete compensation system, including the particular potentiometer arrangement, which more closely approximates the curve of FIG. 3, especially over the range 350°—900° C.

An accurate approximation of the entire desired curve of FIG. 3 (over the range of 350°—900° C.) can be obtained by arranging the potentiometer 56 of FIG. 4, as illustrated in FIG. 1 wherein the potentiometer 62 has a shorting conductor 64 electrically connecting one end 66 of the potentiometer and a point 68 intermediate the ends of such potentiometer. The resistance of the upper and lower sections of potentiometer 62 are 240 ohms and 60 ohms, respectively. With the potentiometer arrangement 66 of FIG. 1, the response curve 70 of FIG. 5 is obtained which will satisfactorily compensate for the error depicted by the response curve of FIG. 2, primarily over the range of 350°—900° C., the normal operating temperature of a jet engine.

Applying the theoretical considerations of the graphs of FIGS. 2.—5, to the circuitry of FIG. 1, the compensation system is utilized in the following manner. A source 72 applies a reference voltage to a variable gain amplifier 74. The output of the amplifier 74 serves as the reference voltage level applied to terminal 36 of the feedback potentiometer 28.

The variable gain of the amplifier 74 is determined by the value of resistance fed back to the amplifier by means of the tap 76 which is positioned by means of linkage 78 in accordance with the instantaneous condition of the indicating portion 38 of the instant invention. Thus, for any particular value of temperature represented by the indicating portion 38, a matching value of resistance is fed back to the amplifier 74 to vary the gain thereof and thereby compensate the level of reference voltage fed to the terminal 36 of the feedback potentiometer 28. As pointed out previously, the gain of amplifier 74 is variable controlled by the position response function of the potentiometer arrangement 62 to follow the response curve of FIG. 5 such that the level of the reference voltage fed to the ratio feedback potentiometer 28 is automatically compensated for the nonlinearity of response of the thermocouple 14 over the entire operating range of the device. Thus the supply voltage at 36 for the feedback potentiometer 28 is not a constant but varies to compensate for the nonlinearity of the sensing means being utilized in the system.

Thus there has been described a jet engine temperature indicator wherein a servo corrected feedback system is used to continually drive the indicator portion of the device toward the value of temperature being instantaneously represented by the temperature-responsive sensing means of the system. The invention provides gain compensation of the feedback system so that the temperature-sensing means such as thermocouples which are not nonlinearly responsive over a large operating range, are compensated or linearized by varying the magnitude of the feedback voltage used in the servosystem in amounts necessary to compensate for the particular degree of nonlinearity introduced by the temperature-sensing means at the particular temperature of operation.

Figure 6:
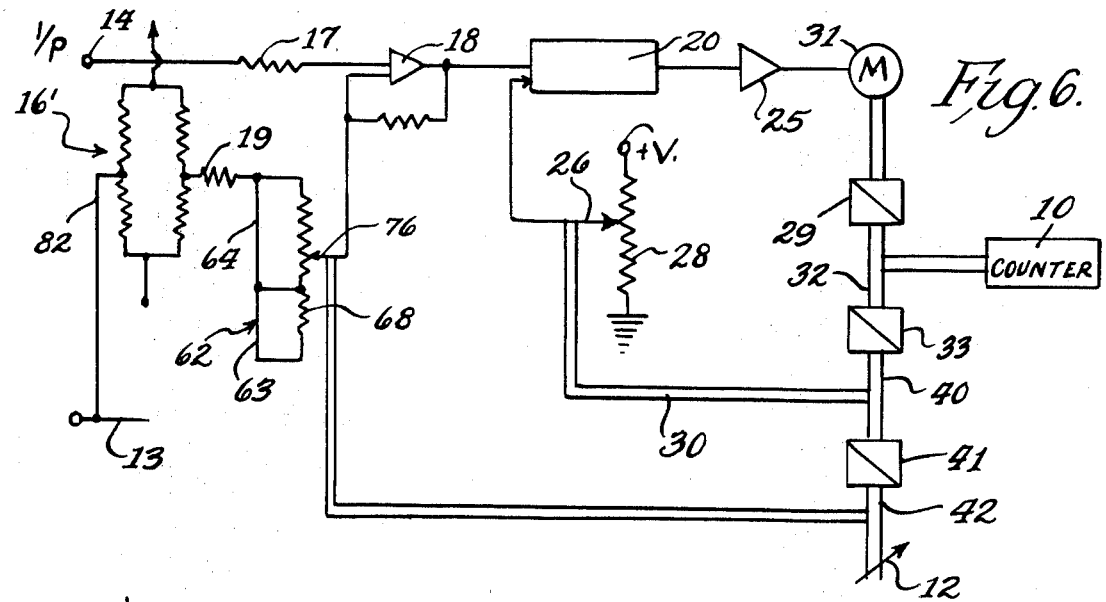
FIG. 6 is a schematic block diagram representing another embodiment of the temperature indicator.

A second embodiment of a temperature indicator system in accordance with this invention, as shown in FIG. 6, includes many of the same components utilized for the embodiment shown in FIG. 1, such components being identified by the same reference numbers. In particular, it should be noted that the feedback potentiometer 28 is here shown as supplied with a constant voltage signal $+V$ so that the feedback signal to the comparator 20 is in this instance linear with indicated temperature. The stepdown ratios of the gearing units 29, 33 and 41 are the same as indicated previously. The feedback linkage 30 again drives the tap 26 associated with the potentiometer 28 while the feedback linkage 78 is shown connected to the tap 76 of a potentiometer 62.

Figure 7:
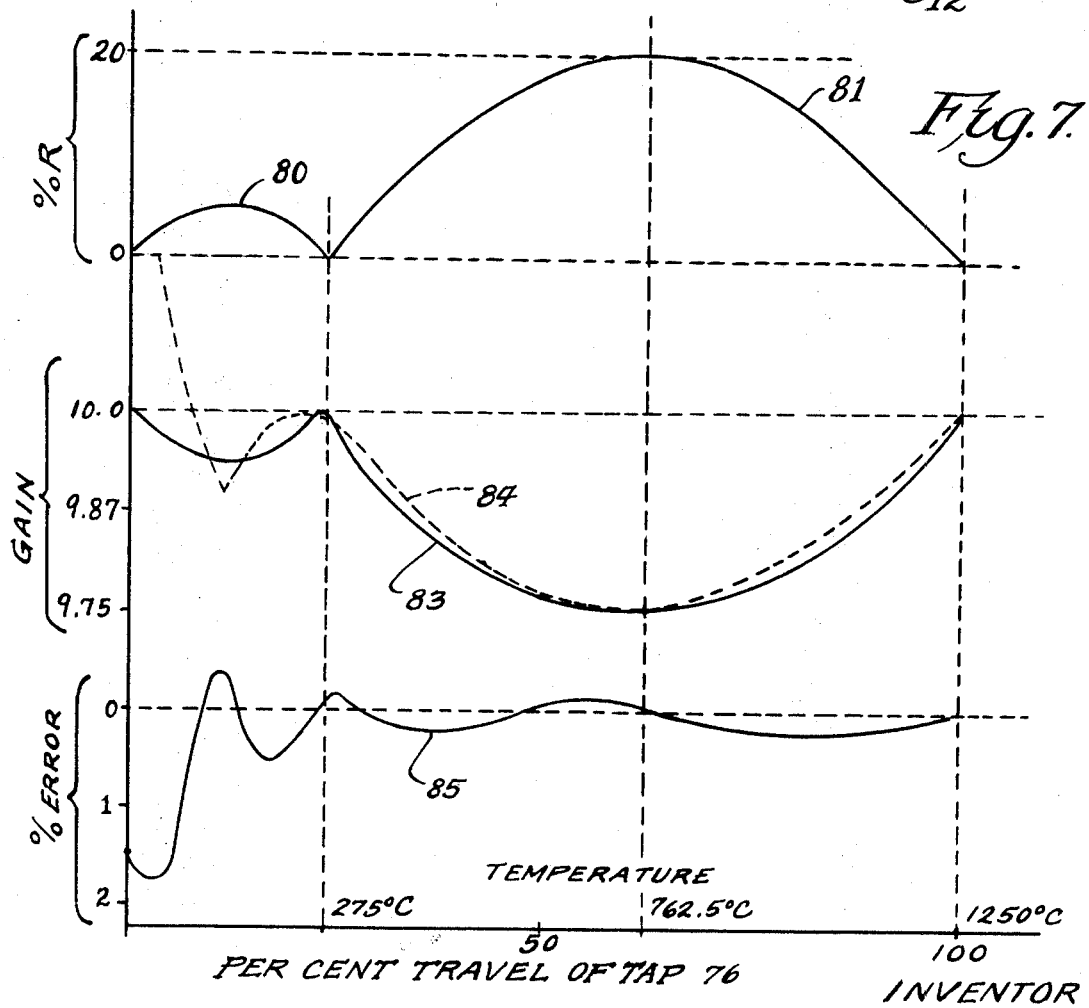
FIG. 7 illustrates various response curves characterizing the embodiment of FIG. 6.

In this embodiment, the potentiometer 62 is interconnected with the thermocouple amplifier 18 in a fashion to introduce gain compensation into the system by varying the input impedance of the operational amplifier 18. Thus, the potentiometer 62 varies the gain so that the output of the amplifier 18 becomes substantially linear with temperature. In this instance, the potentiometer 62 is shown as including, in addition to the short circuit shunt 64 across resistance portion 66, a further short circuit shunt 63 which is bridged across the portion 68 of the resistance path. As shown in FIG. 7, such a potentiometer connection provides a circuit impedance at its tap 76 which exhibits a small symmetrical hump 80 over the region of the potentiometer spanned by the shunt 63 and a large symmetrical hump 81 over the region of the potentiometer spanned by shunt 64. As shown, the shunt 63 spans 22 per cent of the uniform resistance path and the shunt 64 spans 78 per cent.

The cold junction compensator arrangement 16' is shown fragmentally in FIG. 6 as including a bridge circuit which has a ground tap 82 connected to the Alumel conductor 13 of the Chromel-Alumel thermocouple with the temperature-responsive signal which is supplied to the input terminal being fed to the thermocouple amplifier 18 through a series resistor 17. The cold junction compensator, as is conventional practice, corrects the thermocouple EMF for variations due to ambient temperature changes and as connected here to the amplifier 18, also serves to correct for the variation with temperature of the amplifier characteristics. The bridge circuit of the compensator is connected through a series resistor 19 to the compensation potentiometer 62 which is connected with the feedback path to the inverting terminal of the amplifier 18. In FIG. 7, the curve 83 represents the gain required for linearization of the Chromel-Alumel thermocouple characteristics, this curve having been determined by measurements made of actual thermocouples and the curve 84 shows the amplifier gain obtained by use of the short circuit shunt arrangement of the potentiometer 62 connected in the feedback loop of the thermocouple amplifier as shown in FIG. 6. The resultant normalized or linearized thermocouple characteristics are represented by the curve 85 in FIG. 7.

Although the invention has been described above with respect to its preferred embodiments, it will be understood that many variations and modifications will be obvious to those skilled in the art.

For instance, whilst in the second embodiment of the invention, the feedback potentiometer is stated to be supplied with a constant voltage signal such that the feedback signal to the comparator is linear with indicated temperature, it will be appreciated that the linearity of the servo enables any linear signal such as that representative of turbine blade temperature as derived from an optical pyrometer system, to be switched into the indicator as an alternative to the linearized signal from the thermocouple amplifier.

I claim:

1. In a temperature indicator system for operation over a predetermined range of temperature, temperature-responsive means providing an input signal to a portion of said system which signal is representative of actual temperature and exhibits a predetermined nonlinear signal versus temperature response function such that a temperature plot of percent deviation from linearity of said input signal is characterized by a symmetrical valley over said range, servo indicator means in said portion responsive to said input signal for producing indicator-positioning movement, said servo indicator means including amplifier means and compensation means connected in said system for introducing compensation in said system matched to said temperature response and characterized by a corresponding symmetrical curve over said range to linearize indicator-positioning movement relative to temperature, said compensation means including a potentiometer having a uniformly distributed resistance path bridged by a short circuit shunt and traversed by a tap driven by said servo indicator means and connected in gain-controlling relationship in said system and movable between opposite ends of said path in a relationship that is linear with indicator-positioning movement over said range such that the circuit impedance presented by said potentiometer between said tap and said shunt exhibits a corresponding symmetrical hump over said range.

2. In a temperature indicator for operation over a predetermined range of temperature, temperature-responsive means providing an input signal representative of actual temperature and that exhibits a predetermined nonlinear signal versus temperature response function such that a temperature plot of percent deviation from linearity of said input signal is characterized by a symmetrical valley over said range, servo indicator means including amplifier means, indicating means, motor means for positioning said indicating means to provide an indication of temperature, feedback means including signal-generating means responsive to indicator-positioning movement of said motor means for producing a variable reference signal, said signal-generating means including a compensation determining element in the form of a potentiometer having a uniformly distributed resistance path bridged by a short circuit shunt and traversed by a tap that is movable along said path in a relationship that is linear with indicated temperature over said range whereby the impedance between said tap and said shunt exhibits a corresponding characteristic hump over said range, said feedback means including signal divider means connected to said tap, said signal divider means having another tap linearly responsive to said indicator-positioning movement to produce a feedback signal representative of indicated temperature and exhibiting a signal versus temperature response characterized by a symmetrical curve over said range corresponding to and matching said symmetrical valley, and comparison means responsive to said input signal and said feedback signal to control said motor means in accordance with the difference therebetween.

3. In a temperature indicator responsive to a predetermined range of temperature, temperature-responsive means providing an input signal representative of actual temperature and exhibiting a predetermined nonlinear signal versus temperature characteristic over said range, indicating means, motor means for positioning said indicating means to provide an indication of temperature, feedback means including signal-generating means responsive to indicator-positioning movement of said motor means for producing a variable reference signal, said signal-generating means having a gain that is variable over said range said feedback means including signal divider means comprising a potentiometer having one terminal connected to said signal-generating means to receive said reference signal and having a tap movable therealong in a relationship that is linear with indicator positioning movement of said motor means, said tap providing a feedback signal representative of indicated temperature, and exhibiting the same predetermined nonlinear signal versus temperature characteristic over said range and comparison means responsive to said input signal and said feedback signal to control said motor means in accordance with the difference between said signals.

4. In a temperature indicator system for operation over a predetermined range of temperature, temperature-responsive means providing an input signal to a portion of said system which signal is representative of actual temperature and exhibits a predetermined nonlinear signal versus temperature response function that determines a characteristic temperature plot of percent deviation from linearity of said input signal over said range, servo indicator means in said portion responsive to said input signal for producing indicator-positioning movement, said servo indicator means including amplifier means and compensation means connected in said system for introducing compensation in said system matched to said temperature plot, said compensation means including signal-generating means responsive to indicator-positioning movement for producing a variable reference signal that varies over said range in correspondence to said temperature plot, signal divider means including a potentiometer having one terminal connected to receive said reference signal and a tap movable linearly with indicator-positioning movement to produce a feedback signal that is representative of indicated temperature and that exhibits the same predetermined nonlinear signal versus temperature response function, and comparison means responsive to said input signal and said feedback signal to control said servo indicator means in accordance with the difference between said signals.

UNITED STATES PATENT OFFICE
CERTIFICATE OF CORRECTION

Patent No. 3,576,130   Dated April 27, 1971

Inventor(s)   Kenneth R. Curwen

It is certified that error appears in the above-identified patent and that said Letters Patent are hereby corrected as shown below:

Col. 1, line 4: "and wherein it is desired to produce an indication which is linear" should be deleted as it is repeated;
Col. 4, line 72: "variable" should be --variably--;
Col. 5, line 14: After "which are", "not" should be deleted Signed and sealed this 26th day of October 1971.

(SEAL)
Attest:

EDWARD M. FLETCHER, JR.
Attesting Officer

ROBERT GOTTSCHALK
Acting Commissioner of Patent